J. S. WENTWORTH.
Machine for Ascertaining the Area of Hides.
No. 228,791. Patented June 15, 1880.
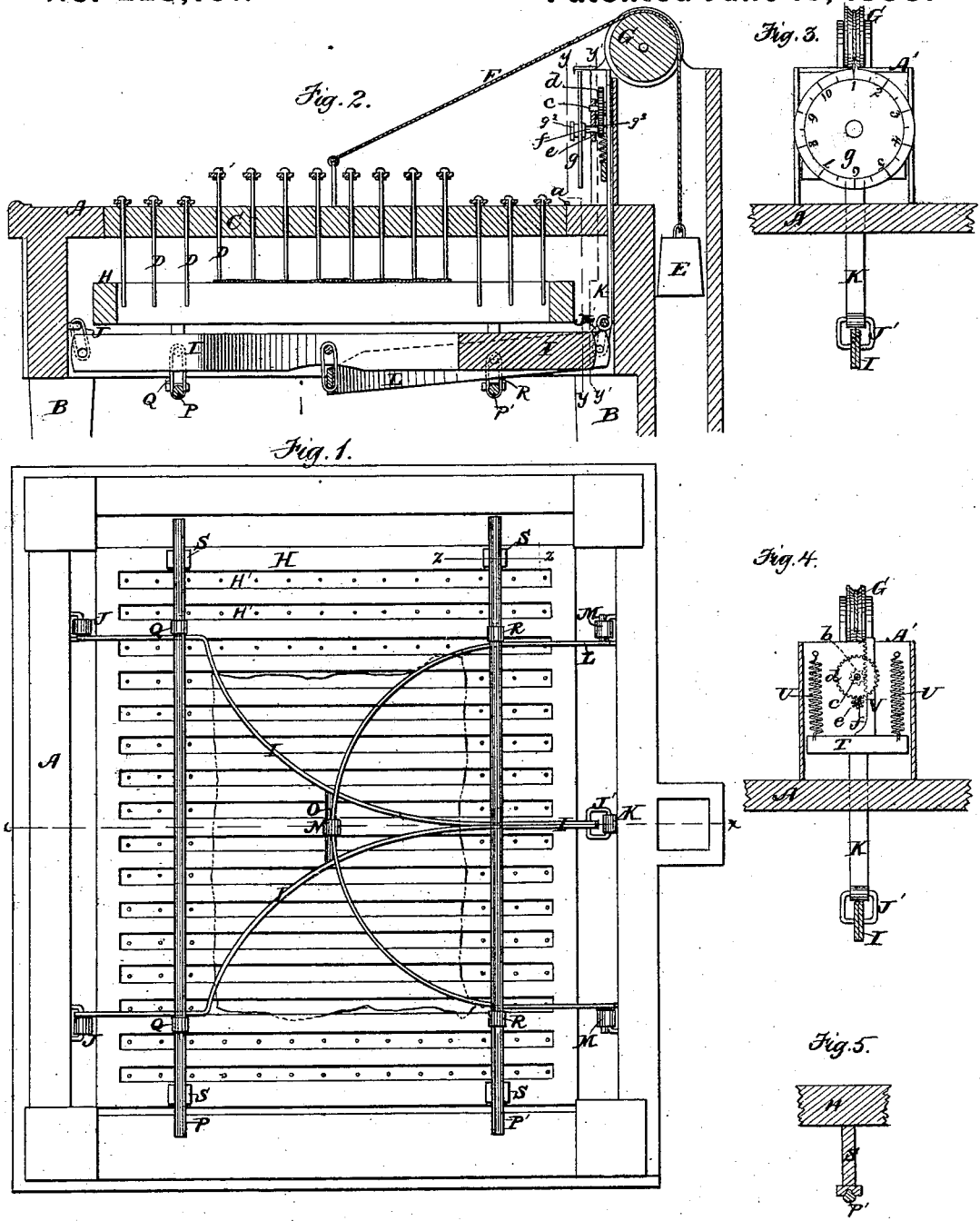

UNITED STATES PATENT OFFICE.

JACOB S. WENTWORTH, OF LYNN, MASSACHUSETTS.

MACHINE FOR ASCERTAINING THE AREA OF HIDES.

SPECIFICATION forming part of Letters Patent No. 228,791, dated June 15, 1880.

Application filed October 13, 1879.

*To all whom it may concern:*

Be it known that I, JACOB S. WENTWORTH, of Lynn, in the county of Essex and State of Massachusetts, have invented certain Improvements in Leather and Morocco Measuring Machines, of which the following is a specification.

This invention relates chiefly to that class of machines for measuring the areas of skins and other irregular articles, wherein a table provided with a series of vertically-movable weights is employed, in combination with weighing mechanism, the arrangement of parts being such that a portion of the movable weights are supported by the skin or other object to be measured, and are caused to operate the weighing mechanism and indicate by their aggregate weight the area of the object that supports them.

The invention has for its object to provide certain improvements in the weighing mechanism, and an indicating device operated thereby, whereby greater accuracy and efficiency of operation are obtained.

To this end the invention consists in the improvements which I will now proceed to describe.

Of the accompanying drawings, forming a part of this specification, Figure 1 represents a bottom view of a measuring-machine embodying my improvements. Fig. 2 represents a vertical section of the same on line *x x* of Fig. 1. Fig. 3 represents a vertical section on line *y y*, Fig. 2. Fig. 4 represents a vertical section on line *y′ y′*, Fig. 2; and Fig. 5 represents a vertical section on line *z z*, Fig. 1.

Similar letters of reference indicate like parts in all the figures.

In the drawings, A represents a suitable frame, supported by legs B B, or otherwise. To this frame is hinged, at *a*, a table or holder, C, which is horizontal, and rests upon suitable seats provided for it on the frame A when in its normal position, and is adapted to be turned on its hinges into a vertical position.

The table C is provided with a series of perforations, in which slide metallic pins or weights D, which are provided with suitable heads, and are adapted to move freely up and down through the perforations when the table is in a horizontal position, the heads resting on the top of the table and limiting the downward movement of the pins. The pins D are arranged in parallel rows, placed as close together as may be desired, and each pin represents one corner of a square inch or other unit of measurement.

The table C is preferably counterbalanced by a weight, E, secured to a cord, F, passing over a pulley, G.

H represents the platen of the weighing mechanism. Said platen is located under the table C, and is supported by mechanism, hereinafter described, in such position that its upper surface is above the lower ends of the pins D when the heads of the latter are resting on the top of the table C.

The platen H is provided with slots or perforations H′, arranged to receive the lower ends of the pins D, so that they will not bear upon the platen when there is no obstruction resting thereon.

The platen is supported by mechanism composed of the following parts, viz: first, a bifurcated lever, I, connected at two of its ends, by links J J, to the frame A, and at its other end, by a link, J′, to a spring-supported vertical bar, K, hereinafter described; second, a curved lever, L, connected at its ends, by links M M, to the frame A, and at its center by a link, N, to a cross-bar, O, on the lever I; third, a horizontal rod or bar, P, suspended from the lever I by links Q Q; and, fourth, a similar rod or bar, P′, parallel with the rod P and suspended by links R R from the lever L.

The platen H is provided with four legs, S, which are provided with $\wedge$-shaped grooves in their lower ends, and rest upon corresponding seats formed on the bars P P′.

The vertical bar K is adapted to slide in guides in the frame A, and is provided with a cross-head, T, to which are attached the lower ends of springs U U, the upper ends of which are attached to a frame, A′, rigidly attached to the top of the frame A. The springs U U constantly exert an upward pressure on the bar K and on the supporting mechanism and the platen H, which is sufficient to overcome the weight of said parts and keep the platen in condition to be depressed by the addition of any weight thereto.

V represents a vertical rack attached to the bar K or its cross-head T. Said rack meshes with a pinion, $b$, on a shaft, $c$, which is journaled in the frame A, and carries a larger pinion, $d$. The latter meshes with a pinion, $e$, on a shaft, $f$, also journaled in the frame A', and provided on its outer end with a suitable indicating device—preferably a graduated dial, $g$. The dial is provided with a button, $g'$, having a square socket, $g^2$, to receive the shaft $f$.

$g^3$ represents a bushing rigidly attached to the dial and surrounding the button $g'$. The bushing has a circular aperture, in which the button $g'$ is fitted, and the bushing is adapted to rotate on the button, although it is fitted so snugly as to prevent it from rotating accidentally. This arrangement enables the dial to be adjusted readily, so that its characters will stand in the proper position when the dial is at rest.

It will be seen that when a piece of leather or other article is laid upon the platen H, the latter, being elevated by the springs U U, will be depressed with its supporting mechanism, and give a downward movement to the bar K and rack V, thereby causing the rotation of the indicating device $g$, through the intermediate gearing $b\ d\ e$, said devices constituting a positive connection between the supporting mechanism and the indicating device, which insures an exact correspondence between the movements of the platen and indicating device, and prevents the latter from oscillating or moving when the platen is stationary. The indicating device is therefore moved in proportion to the depression of the platen H, and indicates the weight upon the platen. When the article weighed is removed from the platen the springs U U, in raising the platen, rotate the indicating device back to its starting-point. Hence the springs perform two functions.

The operation of the leather-measuring machine, as a whole, is as follows: The table C is raised to permit the placing of the leather upon the platen H, and the weight of the leather, as indicated by the indicating device, is noted by the operator. The table C is then lowered to its horizontal position. The leather on the platen constitutes an obstruction, which arrests so many of the pins as come in contact with it before the heads of said pins can rest on the table C. The pins are thus caused to bear upon and depress the platen, the aggregate weight of the arrested pins being indicated by the indicating device. The weight of the pins, which is determined by deducting the weight of the leather from the aggregate weight, represents the area of the leather.

This machine constitutes a simple and effective apparatus for the purpose described.

I am aware that it is not new to indicate the area of a piece of leather by movable weights which are combined by the piece of leather and caused to operate a weighing and indicating device; but I am not aware that a slotted or perforated scale-platen has been before combined with a table having a series of weights, in the manner herein described.

Weights or any suitable means for raising the platen may be substituted for the springs U U.

I claim—

In a leather-measuring machine having a hinged table or holder containing a series of vertically-movable pins or weights, the combination, with said table, of a perforated or slotted scale-platen located under the table, mechanism, substantially as described, to support said platen, a rotary indicating device connected positively by gearing with the supporting mechanism, and means for exerting an upward pressure on the supporting mechanism and platen, as set forth.

In testimony whereof I have signed my name to this specification, in the presence of two subscribing witnesses, this 7th day of October, 1879.

JACOB S. WENTWORTH.

Witnesses:
C. F. BROWN,
GEO. W. PIERCE.